Oct. 5, 1965    T. E. KELLY    3,209,596
PRESSURE SENSING INSTRUMENT
Filed July 18, 1962
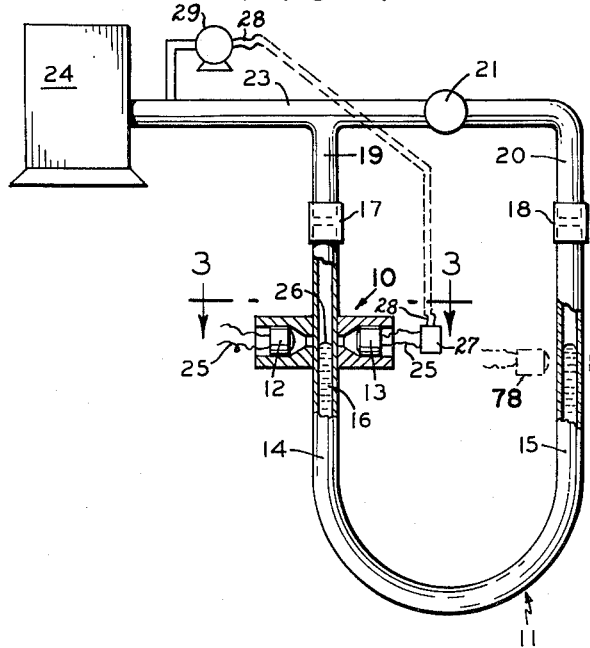
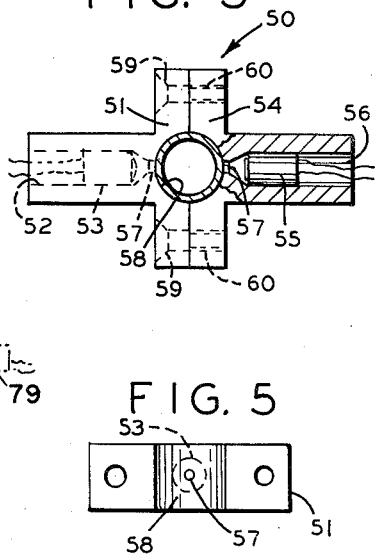
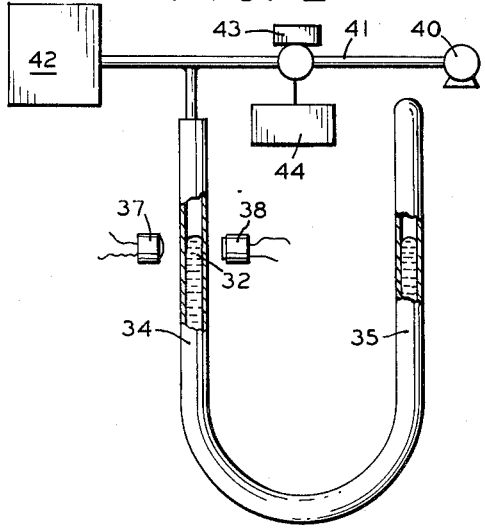
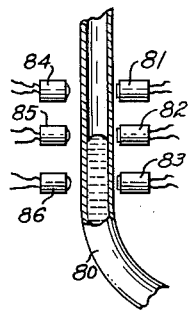
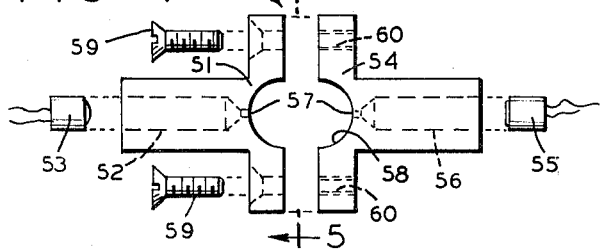
INVENTOR.
THOMAS E. KELLY
BY
*Arthur J. Cantamura*
ATTORNEY.

3,209,596
PRESSURE SENSING INSTRUMENT
Thomas E. Kelly, Portsmouth, Va.
(3529 Bingham Drive, Chesapeake, Va.)
Filed July 18, 1962, Ser. No. 210,673
6 Claims. (Cl. 73—401)

This invention relates to measuring instruments and more particularly to a regulator or device capable of sensitive measurement of changes in pressure or vacuum. Specifically, the invention relates to a pressure sensing and control instrument incorporating means to provide electrical impulses which are responsive to pressure changes for the purpose of maintaining a desired condition, as in constant pressure systems.

A sensing device of this nature has numerous applications in industrial processes as well as for laboratory use. To be effective, because of the character of the applications to which the instrument is put, it must be reliable, reasonable in cost and be capable of continuous trouble-free operation. A variety of manostats, i.e. instruments capable of reacting to changes in pressure, are available commercially. Some designs, for example, employ the Cartesian diver principle, see Analytical Chemistry, vol. 23, page 157, January 1951. Another type utilizes an exposed electrode arrangement. A third example is the instrument which employs a capacitance arrangement.

Cartesian diver manostats consisting of orifice tubes, floats and rubber have the disadvantage of being short-lived in operation before they become inaccurate and unreliable. For example, these are adversely affected by various chemical vapors when used during specific distillations. Generally in devices of this kind, because the float element seals the orifice tube it is critical that the surface of the float be free of contaminants at all times; in most situations of use, contaminant-free conditions are difficult to maintain for lengthy periods of time. Rubber and plastic are subject to swelling in the presence of solvent vapors and the control cannot be used continuously in atmospheres of this kind.

The electrode control type consists of two electrodes contacting mercury. As pressure changes in a system to which this type is applied varies the mercury level, the contact is opened or closed as and when it touches the mercury. This arrangement is disadvantageously affected by arcing which oxidizes the mercury and, as the mercury and leads oxidize, surface contact becomes poor and consequently pressures in the system utilizing the apparatus are not dependably reproducible. Moreover, fixed glass-sealed electrode manostats are difficult to clean and must be soaked or cleansed chemically as with nitric acid resulting in appreciable down time for apparatus of this kind.

In an effort to avoid this latter shortcoming, instruments utilizing adjustable electrodes in conjunction with a pierced rubber stopper have been resorted to. However, the latter arrangement is soon subject to leaks and chemical deterioration and, consequently, it also is generally unsatisfactory.

Capacitance type have the disadvantage that they can only be used in isolated areas since they are adversely affected by the capacitance of other equipment in the vicinity as well as by body capacitance of individuals working in the area, i.e. the capacitance of the human body close to the control will often complete the circuit just by being close to it.

The present invention which comprises in combination an arrangement including a tube of substantially uniform diameter capable of retaining liquid in the lower portion of the tube, preferably a U-type glass tube, in which only the liquid is exposed to the pressure-vacuum system, and a photoelectric cell which is connected so as to be responsive to the liquid level, avoids the shortcomings of the prior art devices referred to hereinabove. In the arrangement of the invention, the photocell electrically actuating suitable switching means may control the pressure (or vacuum) replenishing source as the fluctuation of the liquid operates the cell, to provide a sensing device of extremely accurate control. Because the device which forms the essence of the present invention is relatively inexpensive and relatively simple in configuration and employs no elements which may clog, deteriorate, oxidize or otherwise be affected by chemical attack, it offers an excellent contribution to the prior art of manometer type instruments.

It is accordingly an object of the present invention to provide a novel and advantageous instrument capable of affording accurate control of vacuum and pressure in systems in connection with which it is utilized.

It is another object of the present invention to provide a sensing device for measuring pressure and vacuum conditions which avoids the disadvantages present in arrangements heretofore utilized for this purpose.

It is a further object of the invention to provide an instrument utilizing a photoelectric sensing means to detect the change in pressure or vacuum in a system in which the instrument is employed.

It is a further and more specific object of the present invention to provide a novel and highly useful device in which the regulation of pressure and vacuum by the instrument of the invention is accomplished through use of a photo-sensitive switching means as an indispensible element of the instrument.

Additional objects and advantages will become apparent hereinafter as the invention is described in greater detail in conjunction with the accompanying drawing wherein:

FIG. 1 is a side elevational view partially in section illustrating the invention applied to a system shown schematically.

FIG. 2 is a side elevational view of an alternate embodiment illustrating the invention incorporating a closed-end U-tube.

FIG. 3 is a view taken substantially along line 3—3 of FIG. 1 illustrating a suitable bracket (with photocell contained) for mounting the photoelectric cell to the transparent portion of a U-tube.

FIG. 4 comprises substantially an exploded view of the photocell and bracket arrangement of FIG. 3.

FIG. 5 is a view taken substantially along line 5—5 of FIG. 4 of one-half of the mounting bracket.

FIG. 6 is a fractional view partially in section of a manometer used in conjunction with a plurality of stacked photo cells.

The invention provides advantages in any system in which a response to a change in pressure in the system is desirable such as when a substantially uniform pressure or vacuum is to be maintained. It is particularly advantageous where precise control is critical. For example, in distillation of tar acids such as phenol and cresol, a mixture which distills at about 185° C. it is desirable that distillation occur at about 104° C. and at 50 mm. as compared to atmospheric pressure of 760 mm. In this system only sufficient heat to maintain vapor at 50 mm. should be present. If the pressure increases to about 60 mm. the vapor condenses and the equilibrium necessary to sustain the distillation is lost. Consequently, the increase in pressure that may be tolerated under advantageous conditions is no more than about 2 mm. It is apparent that in various other processes equally, or even more, sensitive control may be critical.

Referring to the drawing, FIG. 1 shows a closed loop tube 11 of substantially uniform diameter formed of suitable material, at least the measuring portion, i.e. the portion near the photoelectric cell, being transparent. Various materials may be employed as the liquid retaining member. For example in very high pressure systems a metallic, e.g. steel, fluid tube or manometer may be used in conjunction with high pressure glass pipe for the necessary transparent section. Generally the fluid tube or manometer comprises glass and Pyrex glass is preferable. A photoelectric cell and light combination 10 of conventional commercially available type comprising a light source 12 electrically connected at 25 to a source of electrical current (not shown) in combination with a light sensitive component or cell 13 is suitably arranged in contiguous relationship to the leg 14 of the tube 11 so as to sense the movement of the height of the liquid 16 as it is varied through pressure change. The legs 14 and 15 of the tube 11 may be isolated by means of commercially available conventional valve 21. The closed loop tube of FIG. 1 may comprise an integral element or the lower most portion may be a U-shaped tube coupled by suitable connection 17 and 18 through lines 19 and 20 to a pressure (or vacuum) system 24 through line 23. The couplings 17 and 18 may be any suitable glass to metal connectors such impervious chemically inert tubing which provides appropriate sealing. The glass tube contains an opaque fluid 16 such as mercury. To facilitate description, mercury will generally be referred to herein as the fluid but it will be apparent that various other fluids may be utilized. The sensing device comprises a conventional photocell device of the kind which may be obtained commercially e.g. such as the selenium sulfide or lead sulfide type. The cell is positioned substantially at the mercury level 26 as shown in FIG. 1 of the drawing. The photoelectric cell unit, through conventional electrical switching means 27 connected to leads 25, and in turn through leads 28, may directly control the pressure or vacuum source 29 such as a vacuum pump or compressor, etc. Alternately, the photoelectric cell may operate a solenoid or automatic valve in a line leading to such pressure or vacuum sources in which there is a constant supply of pressure or vacuum.

In operation, when the valve 21 is open, both legs 14 and 15 of the tube 11 are at the same pressure (or vacuum) as the system and the fluid level remains at the same level regardless of pressure (or vacuum) changes. However, when the valve 21 is closed, only one leg 14 is exposed to the system and the pressure (or vacuum) in the other leg 15 is isolated and remains at whatever pressure (or vacuum) existed when the valve 21 was closed. For simplicity, the one leg 14 is referred to as the system pressure and the isolated leg 15 as the original reference pressure. When the desired pressure (or vacuum) is reached in a system, the valve 21 is closed and the pressure (or vacuum) source is switched into the photoelectric unit 10 for automatic control. It is thus seen that the instrument of the present invention has the capability of itself providing the reference pressure; no external reference pressure source is required for its use. In the case of a pressure system, any leak from the system will be reflected by the liquid rising in the system leg 14 since the pressure in the reference leg 15 would then be greater. As the liquid rises in the leg 14, it interrupts the light from source 12 thereby, through electrical connection, switching on, or cutting in, the pressure source to restore the desired pressure where this is the desired reaction to the loss of pressure in the system.

On the other hand, when the device of the invention is used in conjunction with a vacuum system, any leak in the system increases the pressure and the liquid level will drop in the system leg 14 since the pressure is now greater than the reference pressure in the reference leg 15. The light source would then be positioned on the leg 15 so as to operate as described above in connection with the pressure system. Alternately, the photocell may be as shown on leg 14 but in a manner so that the switching on of the vacuum source occurs when the liquid level falls below the light source, i.e. in the latter case the vacuum pump is applied when the light beam ceases to be interrupted by the liquid level. These changes in the liquid level thus either interrupt (where the liquid 16 rises between elements 12 and 13) or expose the light source (as the liquid recedes) to the photoelectric cell, depending on the chosen application.

Although the invention has been described in connection with the system pictured in FIG. 1 of the drawing, the photocell device of the invention finds general applicability in any system in which a reaction to a fluctuation in the level of the liquid due to pressure variations occurs. The position of the cell in respect to use on the system leg or the reference leg is a matter of preference depending on the use of a normally open or normally closed circuit.

The sensitivity of this type of control can be varied by using opaque liquds having different densities and consequently different fluctuations for a given pressure differential. Thus, mercury manometers are sensitive to less than 1 millimeter variation while less dense dyed aqueous solutions are sensitive to changes considerably less than 1 millimeter of mercury. Non-opaque liquids can be employed with an opaque float serving as the contact point between the cell and light source. In addition to mercury which is generally the standard liquid in U-tube manometers, and is the preferred liquid to interrupt the light source in the device of the invention, any fluid which is opaque and liquid under conditions of use may be employed. Opaque manometer liquids can be prepared, for example, by using standard pigments and dyes in aqueous solutions or organic media. India ink dye, aniline blue, aniline yellow and tartrazine are a few examples of dyes capable of yielding opaque solutions. Various other colorants or additives productive of opaqueness in suitable liquids which are well known in the art may also be used. It will be apparent that the choice of dye and solute (aqueous or organic) will frequently be governed by the range of operating pressure of the system in which the instrument is employed. For example, water or low-boiling organics and dyes which will volatilize would not be suitable under conditions such as say 10 mm. of mercury. In most situations pressure ordinarily presents no problem in the choice of liquids but vacuum frequently does. Indicators (dyes whose color depends on pH) can also be used in aqueous or organic solutions where the color depth can be deepened by adjusting pH. These must be considered in the same manner as the above choice of dyes and pigments. Common indicators are generally listed in standard chemical handbooks. Methylene blue is a typical example. In addition to opaque liquids as the medium whose level is used to sense pressure variations directly, it will be apparent that a float carried by a transparent liquid may also be usefully employed to interrupt the light source to its corresponding photocell.

A U-shaped closed end tube of the type illustrated in FIG. 2 and which is commercially available in various sizes may also be used as the pressure indicator for the control system of the invention. In this closed end tube, the sealed leg of the tube is completely filled with mercury by evacuating the tube, adding a premeasured volume of mercury, then increasing the pressure to atmospheric conditions. Mercury fills the sealed leg of the tube and the lower section of the U-bend and there is practically no liquid in the open leg. As vacuum is applied to this filled tube, the mercury 32 rises in the open leg 34 and drops in the sealed leg 35 and the pressure reading is the distance between the two mercury levels.

As shown in FIG. 2, a continuously operating vacuum pump 40 supplies its maximum capacity through line 41 which is isolated from the system 42 by a solenoid valve 43. A photoelectric arrangement attached to leg 34 and comprising a light source 37 and cell 38 operates the relay 44 which in turn energizes the solenoid valve 43. When vacuum is applied to the system, the solenoid valve 43 is open and the mercury 32 will rise in leg 34 until it intercepts the light source 37 thus closing the solenoid valve 43. If the system 42 is not leakproof, air will enter the leak sources and the mercury level will drop in the open leg 34 and rise in the sealed leg 35. This exposes the photoelectric cell 38 to the light source 37 and the solenoid 43 is immediately energized until vacuum is restored and the mercury 32 again intercepts the beam of light. It will be apparent that the solenoid valve 43 and relay 44 may be eliminated from a system of this type if the vacuum pump is only operated when required. In that event, the photoelectric arrangement 37, 38 is connected to the vacuum pump 40 turning it on or off as the mercury 32 falls and exposes the cell 38 to the light source 37 or as it rises to intercept the beam of light, respectively. In this particular application, the absolute pressure indicating manometer is also used as the controller for actuating the photoelectric cell. This eliminates separate controlling and indicating systems and enables the operator to preset his pressure conditions accurately and simply. Again, in the arrangement of FIG. 2, as in FIG. 1, the cell can be positioned on either leg of the tube depending on the type of control available, i.e. whether normally opened or normally closed.

Distillation units are a classical example of systems requiring sensitive controls. In such systems because of serious difficulties experienced when using manostats, e.g. high cost, limited size, chemical corrosion, complexities due to delicate structure, cleaning, poor reproduction of pressures, operators have resorted to hand-operated air-bleed valves for control. In accordance with the present invention all of these difficulties are avoided. The device of the invention is low in cost, unlimited in size, offers a corrosion resistant structure, greatly simplified in design, is easily cleansed and provides excellent control and sensing of pressures or vacuum in the system to which it is applied.

Various additional operations may make use of the device herein provided to visually observe the pressure drop in units where there is a flow of liquid, vapors, viscous mixtures or solids. In a manner mentioned above, the photo cell light source assembly of the invention may be used to correct automatically undesirable pressure drops. During distillations, the pressure drop across the fractionating column provides critical data related to boil-up, through-put, hold-up and flooding. This pressure differential is visually observed, as is common practice, on open end U-type manometers. Changes or variations are normally associated with changes in source pressure, excessive liquid in the column (flooding) due to superheating or a malfunction in the system preventing normal pressure dissipation. The use of a photocell unit or units on such U-type manometers set at the desired differential can have many functions, i.e. controlling heat input, operate a fail-safe system or compensating for pressure changes by supplying or removing pressure via of automatic valves. This fine control of pressure drop will improve distillation techniques and efficiency by maintaining equilibrium in such a system.

Various additional applications will become apparent to those skilled in the art of pressure and vacuum control systems. Fail-safe technology may also advantageously utilize such a sensitive control system especially where excessive self-generated pressure such as obtained during some chemical reactions presents a hazard. The photocell unit of the invention preset on a pressure manometer can operate a valve or solenoid to relieve pressure; operate a valve or solenoid to discharge materials from a system; or, in the case of special catalytic reactions, operate a valve to automatically feed to such systems neutralizing agents or catalyst poisons.

In connecting the photoelectric arrangement to the pressure sensing tube any suitable adapted may be used, e.g. the arrangement illustrated in FIGS. 3, 4 and 5. As shown, a two-piece plastic adapter 50 comprising substantially similar halves; one half 51 which houses the light source 53 in a recess 52 drilled therein and half 54 which houses the cell 55 in a recess 56. Apertures 57 which open into recesses 52 and 56 to emit and receive light, respectively, are preferably treated in a manner well known in the art to inhibit glare and improve accuracy, i.e. increase sharpness of photocell response. The adapter 50 is suitably constructed so as to have concave recesses 58 to mate with the contour of the cylindrical tube wall and is secured thereto in a suitable manner as by use of screws 59 passing through half 51 and fitting into threaded recesses 60 in half 54 to which it is secured.

The following illustrative example further illustrates one advantageous application of the invention.

*Example 1*

A vacuum system comprised of a vacuum pump, solenoid, relay and a 30-gallon tank was observed using a closed end tube equipped with a photoelectric cell light source, similar to the arrangement in FIG. 2. The cell and source was housed in an opaque plastic holder (as illustrated in FIGS. 3, 4 and 5) constructed in two pieces which bolt together snugly around the glass tube.

The photo cell unit was set for a reading of 10 millimeters of pressure on the tube. The light cell 38 controlled the vacuum source by operating the solenoid which isolates the vacuum source 40 which is constantly operated from the system. The vacuum source closed at 10 millimeters of mercury and an intentional leak was provided of a magnitude so as to increase pressure in the order to 15 millimeters/min. in the 30-gallon tank to which the instrument is connected to observe sensitivity of control. Sensitivity was measured with a millimeter scale attached to the tube. The response to pressure changes was so sensitive and vacuum was restored so rapidly through the photoelectric switching that the changes could not be measured as a practical matter. Sensitivity of the photocell arrangement was well within one millimeter. This is considered to be exceptionally sensitive for vacuum control.

*Example 2*

The closed loop device shown in FIG. 1 was tested similarly in a 30-gallon pressure system substituting an air pressure line for the vacuum pump used for Example 1. As applied to this system the instrument was set to function to supply make-up pressure when the light source 12 to cell 13 was interrupted. At twenty p.s.i., and with an intentional slow leak resulting in a pressure drop of 0.5 pound in one minute, the pressure compensation through the photoelectric switch to the pressure restoration source was so rapid that a pressure gage sensitive to one ounce showed no deflection. When the system was operated without restoration of pressure through the control mechanism of the invention, the pressure had dropped 5 pounds in 10 minutes.

*Example 3*

The use of the instrument of the invention in conjunction with a fail-safe system is demonstrated using the arrangement shown in FIG. 1, modified by adding a second photoelectric cell arrangement 78 and 79 (shown in phantom) to the opposite reference leg in the proximity of the liquid level in that leg. The photocell unit on the system leg 14 controlled the pressure source to the system and the photocell unit 79 on the reference leg 15 controlled a vent valve (not shown) attached to the system. A 30-gallon system was pressurized to 15 p.s.i. and the valve 21 which isolates the legs of the tube 11 was closed. The mercury level is the same in both legs of the tube and the second photocell unit 79 on the reference leg was fixed at ¼ inch above the mercury level so as to function when the light source was interrupted upon elevation of the mercury in leg 15. The photocell unit on the system leg 14 is also located adjacent but above the mercury level for sensitive control of pressure. The cell functions when the light beam is interrupted. The pressure source control was intentionally by-passed to bleed pressure into the 30-gallon system thus increasing the pressure above 15 p.s.i. As the pressure exceeded 15 p.s.i. the mercury level dropped in the system leg 14 of the tube and rose in the reference leg 15 and interrupted the light source to the cell 79 on the reference leg which simultaneously opened the vent valve bleeding off the excess pressure. In this case, the pressure did not exceed 16 p.s.i. but the sensitivity in a case of this nature depends on the position of the cell in respect to the surface of the liquid in the tube. If both photoelectric cell units are located as close as possible to the surface of the liquid, then control is extremely sensitive.

To further demonstrate the effectiveness of this safety practice, the system was again set at 15 p.s.i. then the pressure source valve was intentionally opened to supply continuous pressure from a 50 p.s.i. source. The rising fluid in the reference leg 15 of the tube 11 interrupted the light source as in the previous case and the cell automatically energized the vent valve. The excess pressure was continuously bled from the system and the pressure in the system did not exceed 16 p.s.i. Bleeding of pressure from any type of system may be effected. The vent may actually be a base valve instead to drain off liquids, or as in the discussion hereinabove in conjunction with chemical reactions, it will be understood that it may be a valve bleeding in catalyst portions or neutralizing agents.

While the invention has been described in conjunction with photocells mounted and operable individually in conjunction with a fluid level altered by variations in pressure in a system to which it is applied, it will be apparent that the photocell units in certain systems may advantageously be employed in multiples in a stacked relationship to be actuated at various progressive predetermined fluctuations in sequence. An arrangement of this kind may suitably be employed for example in systems in which sensitivity of pressure control is not paramount or alternately where aqueous or organic fluids are used in a given system and sensitivity is thereafter increased by conditions affecting the system pressure. Considering the back of three photocells mounted on the leg of the tube 80 in FIG. 6, the photocell 83 would energize when exposed to the light from source 86 and cells 81 and 82 would be energized when the light from sources 84 and 85, respectively, is interrupted. In particular, for example, when used in a pressure system cell 82 may be employed to control pressure. When the pressure increases and the fluid level drops cell 83 then being exposed to the light source may be utilized to switch open a vent. When the pressure drops and, in the event the cell 82 fails to actuate the pressure restoration apparatus, cell 81 may be utilized as a safety device in which an auxiliary pressure supply, or an alarm, or a fail-safe arrangement, is actuated.

While the invention has been described in conjunction with a closed loop and closed end tubes, the invention contemplates use of the photocell in combination with pressure responsive instruments of other configurations and shapes known in the art, including for example, tubes in which the pressure is measured against the elastic force of a spring or an elastic diaphragm (as in an aneroid barometer) and the like.

Various changes and arrangements may be made in the above-described configurations without departing from the scope of the inventive concept presented. It is accordingly intended that matter contained in the above description or shown in the accompanying drawings shall be interpreted as illustrative and not as a necessary limitation on the invention.

I claim:

1. A pressure sensing device comprising in combination a tube, of substantially uniform diameter, said tube defining a closed loop and being capable of retaining liquid which is responsive to pressure changes in its lowermost portion, a valve within said loop situated above the liquid level in said tube, said valve isolating one part of the loop above the liquid from the other part of the loop above the liquid and from a system to which the tube is connected, said tube comprising at least a segment thereof which admits the passage of light therethrough, a single opening in said tube adapting the tube for connection to a pressure system in which it is desired to sense a change from a predetermined pressure set in the system, a liquid in said tube capable of actuating a light beam when the liquid level changes in response to a change in pressure in a system to which the tube is connected, a photocell on one side of said segment, and a source of light positioned so that a beam of light is directed through said segment onto said photocell, electrical switching means connected between said photocell and a means communicating with said tube for restoring the pressure to that predetermined for the system said photocell being arranged so that when the liquid level in said tube is varied as a consequence of a change in the predetermined pressure, said light source is interrupted thereby actuating said switching means.

2. The device of claim 1 in which said liquid retaining tube comprises glass.

3. The device of claim 1 in which the liquid in said tube comprises mercury.

4. A pressure sensing device for sensing change from, and initiating restoration to, a predetermined pressure in a system comprising in combination a substantially U-shaped tube having a substantially uniform cross section, said tube being capable of retaining a liquid which is responsive to pressure changes in its lowermost portion and having a closed end which is evacuated prior to the introduction of liquid into said tube, said tube comprising at least a segment thereof which admits the passage of light therethrough, a single opening in said tube adapting the tube for connection to a pressure system in which it is desired to sense a change in a predetermined pressure set in the system, a liquid in said tube capable of actuating a light beam when the liquid level changes in response to a change in pressure in a system to which the tube is connected, a photocell on one side of said segment and a source of light positioned so that a beam of light is directed through said segment onto said photocell, electrical switching means connected between said photocell and a means communicating with said tube for restoring the pressure to that predetermined for the system said photocell being arranged so that when the liquid level in said tube is varied as a consequence of a change in the predetermined pressure, said light source is interrupted thereby actuating said switching means.

5. The device of claim 4 in which said liquid retaining tube comprises glass.

6. The device of claim 4 in which the liquid in said tube comprises mercury.

References Cited by the Examiner

UNITED STATES PATENTS

| | | | |
|---|---|---|---|
| 2,071,698 | 2/37 | Mample | 73—40.5 |
| 2,118,029 | 5/38 | Boyd | 73—401 X |
| 2,362,446 | 11/44 | Bodine | 73—116 |
| 2,376,459 | 5/45 | Stevens. | |
| 2,701,854 | 2/55 | Carrick | 73—401 X |
| 2,764,178 | 9/56 | Paul et al. | 250—218 X |
| 2,817,237 | 12/57 | Stevens | 73—401 |
| 2,818,726 | 1/58 | Amonette et al. | |
| 3,025,405 | 3/62 | Dadas | 73—401 X |
| 3,028,750 | 4/62 | Rondeau | 73—49.2 |

LOUIS R. PRINCE, *Primary Examiner.*

JOSEPH P. STRIZAK, DAVID SCHONBERG, RICHARD C. QUEISSER, *Examiners.*